Nov. 4, 1930.                A. A. CANTON                1,780,339
                        COMBINATION MOTOR AND PUMP
                          Filed Jan. 28, 1929

INVENTOR
Allen A. Canton
BY
J. Kaplan
ATTORNEY

Patented Nov. 4, 1930

1,780,339

UNITED STATES PATENT OFFICE

ALLEN A. CANTON, OF NEW YORK, N. Y., ASSIGNOR TO GLACIER, INC., OF THE STATE OF NEW YORK

COMBINATION MOTOR AND PUMP

Application filed January 28, 1929. Serial No. 335,725.

This invention relates to a combination motor and pump and more particularly to the means for making the field surrounding the armature leak-proof so that no gas or fluid around the armature can escape to the atmosphere by the way of the stator core.

The principal object of the invention is to provide a device of this character having a stator core and armature and provided with end plates which are firmly secured to the field making a leak-proof chamber in which the armature rotates.

Another object of the invention is to provide a ring at each end of the stator core laminations having a threaded and cored out flange to which are screwed the end plates for making a leak-proof armature and pump chamber.

Other objects will appear as the disclosure progresses. The drawings are intended to merely indicate a possible embodiment of the invention. It is obvious that the actual needs of manufacture may necessitate certain mechanical changes. It is therefore not intended to limit the invention to the embodiment illustrated but rather to define such limits in the appended claims. For a more general understanding of the invention attention is now called to the drawings in which a preferred embodiment is shown illustrated. In these drawings like parts are designated by like reference characters throughout the specification.

Figure 1:
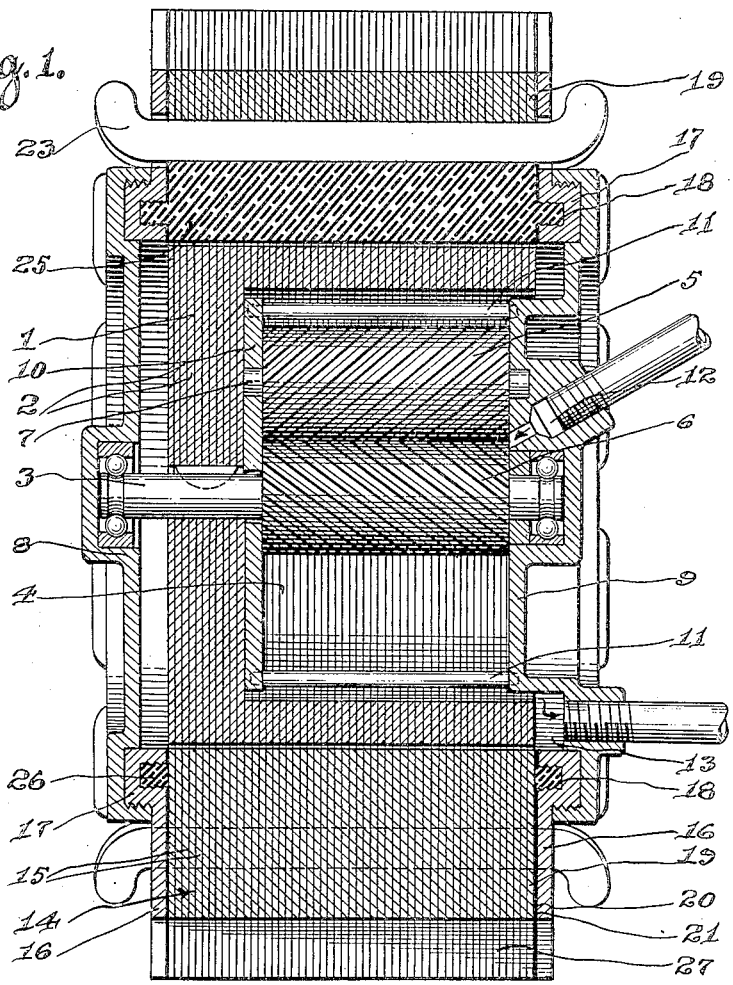
Fig. 1 is a cross section of a combination motor and pump.

Referring now to the drawings in detail, numeral 1 designates the armature formed of laminations 2 and keyed to the central shaft 3. The armature is hollowed out forming a cavity 4 into which is placed a pair of oppositely rotating gears 5 and 6 meshing with each other. The gear 5 is fixed to the auxiliary shaft 7 while the gear 6 is attached to the main shaft 3. The bearings for the main shaft 3 are in the end plates 8 and 9 while the bearings for the auxiliary shaft 7 are in the end plate 9 at one end and the opposite end in the inner plate 10. The said inner plate is non-revolving and is kept in a stationary position by the connecting rods 11. Numeral 12 designates the inlet port which is adjacent the place where the gears 5 and 6 mesh and 13 is the outlet port. When the gears revolve oppositely to each other a suction is formed at the port 12 and the gas or liquid is drawn in by the well known manner and then forced out through the outlet port 13.

The stator core 14 surrounding the armature is formed of laminations 15. At both ends of the last laminations are rings 16 made of substantial heavy material and provided with cored out threaded flanges 17 to which are attached the end plates 8 and 9. The flanges are provided with a core 18 for a purpose to be later described.

The end laminations 19 which come in contact with the rings 16 are preferably roughened as at 20 and coated with a liquid binding material 21 so when the structure is placed together and firmly tightened by the aid of the bolts 22 a leak-proof connection will be made.

Figure 2:
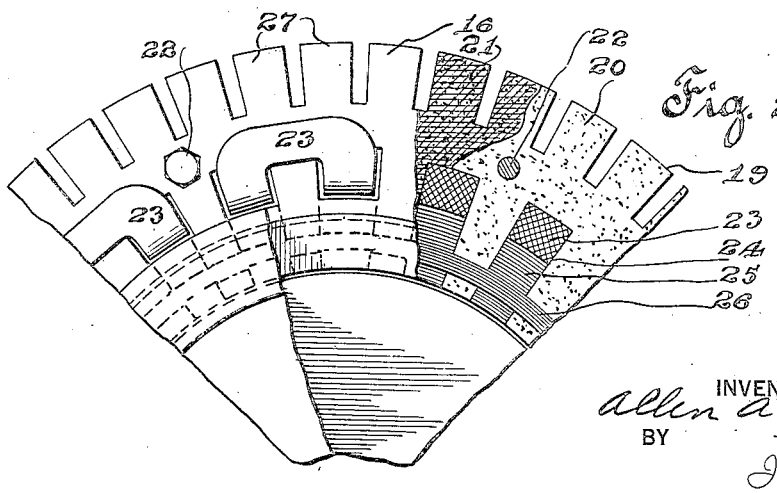
Fig. 2 is a fragmentary end view thereof.

Numeral 23 represents the usual motor windings around the stator core and 24 the slots or recesses to house the windings. The slots are made deeper than the thickness of the series of windings so that in the portion which is not taken up by the windings can be placed an insulating and leak-proof compound 25 for sealing in their recesses against any leakage. It might be said here that the insulating material is poured into the recesses 24 while in a liquid state and when it congeals a solid and rigid air tight mass is formed. The compound will also fill up the interiorly threaded core 18 of the flange 17 and thus form a ring 26 on the end lamination as shown in Fig. 2. The purpose of threading the interior of the core 18 is to make a more efficient water tight joint.

Formed in the stator core around the outer periphery are a series of fins 27 so as to provide a large surface area for carrying away the heat generated in the device.

I make no claim herein to the broad idea of a combination motor and pump in which the pump is operated by the revolving armature as the same is the subject of my application Serial No. 329,575 filed December 31st, 1928. Nor do I claim the broad idea herein of making a leak-proof chamber for the pump to operate in as the same is made the subject of my applications Serial Nos. 335,723 and 335,724, both filed January 28th, 1929.

It will thus be seen that I have provided an efficient and simple method of making the stator core surrounding the armature leak-proof. The insulating compound 25 plus the collars 16 and end plates 8 and 9 will make a tight joint and prevent any gas or liquid within the confines of the stator core from reaching the atmosphere. It will be noted that no packing of the pump is required thereby doing away with a source of leakage and loss of efficiency. The entire pumping mechanism is enclosed in a leak-proof and self contained housing thereby forming a simple efficient device of relatively few parts.

Having described my invention, I claim:

1. In a device of the class described, the combination of an armature, of a stator core surrounding said armature, said stator core consisting of a series of laminations, the end laminations being roughened and coated with a binding compound, flanged rings attached to the said end laminations, end plates attached to said rings, said end plates forming a leak-proof enclosure for said armature.

2. In a device of the class described, the combination of an armature, of a stator core surrounding said armature, said stator core consisting of a series of laminations fastened together, the end laminations being roughened and coated with a binding compound, flanged rings attached to said end laminations, end plates attached to said rings, said end plates forming a leak-proof enclosure for said armature, and means in said end plates for forming a bearing for said armature.

3. In a device of the class described, the combination of an armature, of a stator core surrounding said armature, rings at each end of said stator core, said rings provided with a flange having a cored out portion, a leak-proof insulating compound in said cored out portion, end plates attached to said rings and forming a leak-proof enclosure for said armature.

4. In a device of the class described, the combination of an armature, of a stator core surrounding said armature, said stator core consisting of a series of laminations fastened together, the end laminations being roughened and coated with a binding material, flanged rings attached to said end laminations, said flanged rings having a cored out portion, a leak-proof insulating compound in said cored out portion, end plates attached to said rings and forming a leak-proof enclosure for said armature.

5. In a device of the class described, the combination of an armature, of a stator core surrounding said armature, said stator core consisting of a series of laminations fastened together by bolts, the end laminations being roughened and coated with a binding material, flanged rings attached to said end laminations, said flanged rings having a cored out portion, a leak-proof insulating compound in said cored out portion, end plates attached to said rings and forming a leak-proof enclosure for said armature, and bearings in said end plates for said armature.

Signed at New York in the county of New York and State of New York this 24th day of January A. D. 1929.

ALLEN A. CANTON.